United States Patent [19]

Richardson

[11] 4,169,410

[45] Oct. 2, 1979

[54] INDEPENDENTLY CONTROLLED TWINE KNIVES

[75] Inventor: John S. Richardson, Terre Hill, Pa.

[73] Assignee: Sperry Rand Corporation, New Holland, Pa.

[21] Appl. No.: 894,456

[22] Filed: Apr. 7, 1978

[51] Int. Cl.² .............................................. B65B 13/02
[52] U.S. Cl. ...................................................... 100/5
[58] Field of Search ................. 100/5, 13, 88; 56/341, 56/342, 343

[56] References Cited

U.S. PATENT DOCUMENTS

| | | | |
|---|---|---|---|
| 2,627,223 | 2/1953 | Berge | 100/13 |
| 3,064,556 | 11/1962 | Luebben | 100/5 |
| 3,884,138 | 5/1975 | Rice | 100/5 |
| 4,062,279 | 12/1977 | Grube | 100/5 |
| 4,072,095 | 2/1978 | Campbell | 100/5 |

Primary Examiner—Billy J. Wilhite
Attorney, Agent, or Firm—Ralph D'Alessandro; Frank A. Seemar; John B. Mitchell

[57] ABSTRACT

In a crop roll forming machine of the type having a bale forming region defined by bale forming means movably mounted on a mobile frame and wrapping means to bind a formed roll of crop material with a binding material there is provided a plurality of independently operable severing means that, in synchronization, will be activated by triggering means to concurrently sever the binding material. The severing means are comprised of a plurality of cutting blades and striker plates which cooperatively interface at the conclusion of a bale wrapping cycle to sever the binding material.

8 Claims, 7 Drawing Figures

INDEPENDENTLY CONTROLLED TWINE KNIVES

BACKGROUND OF THE INVENTION

This invention relates to the twine wrapping mechanism commonly found in a crop roll forming machine and, more particularly, to apparatus for independently operating a plurality of cutting knives to sever the binding material placed about the periphery of a completed crop roll by the twine wrapping apparatus.

Recently the practice of harvesting crop materials, such as hay, alfalfa, or corn stover, by forming such crop materials into large cylindrically shaped rolls using large roll forming machines has become increasingly popular and economically advantageous in the agricultural industry. The formation of crop materials into large compact cylindrical rolls, rather than rectangular bales as formerly done, permitted the crop material to be deposited in roll form and left in fields for extended periods of time since the rolled material tended to provide a self-shedding protective covering from inclement weather. The ability to leave these rolled bales in fields thus obviated the formerly required additional steps of gathering the rectangular bales and transporting them to a storage area protected from the elements.

The forming of crop material into compact rolls itself is not new. The origins can be traced back 30 or 40 years to the small cylindrical bale of hay or other fiberous material produced by the type of machine illustrated in U.S. Pat. No. 2,336,491, dated Dec. 14, 1943. The rolls of crop material produced by this type of machine, in the context of the economic factors of the current agricultural marketplace, suffered from the principal disadvantage of producing rolls of such small diameter that excessive spoilage occurred around the periphery of the roll in comparison to the overall diameter of the roll due to weathering when such rolls were stored in the field.

A later type of machine produced generally cylindrically shaped rolls of crop material by rolling the material along the ground until a roll of desired size was obtained. Crop rolls of this type, produced by machines of the type disclosed in prior U.S. Pat. No. 3,110,145, dated Nov. 12, 1963, suffered several inherent disadvantages because of the technique that was used to form them. This technique permitted an undesirable amount of crop material to be left upon the ground without being included in the crop roll. Additionally, dirt, clods of earth, stones and the like were picked up by the roll and included therein.

The latest and most successful type of machine forming crop rolls utilized a method which picked up a swath or windrow of crop material from the field and deposited it onto a lower conveyor. The conveyor then transported the material to a roll forming region where an apron or flight of belts, usually positioned above and adjacent the conveyor, moved in a suitable direction to rotate the crop material and form a large, compact cylindrical bale. Variations of the type of machine utilizing this principle are illustrated in U.S. Pat. No. 3,859,909 to Mast dated Jan. 14, 1975, and U.S. Pat. No. 3,722,197 dated Mar. 27, 1973.

All of the above-cited crop roll foming machines utilized in some form crop material binding means to wrap the various sized compact crop rolls. The binding material commonly took the form of twine and the binding means, accordingly, became known as twine wrapping means or apparatus. The apparatus was used in a twine wrapping cycle that included the steps of feeding the twine, wrapping the completed roll or bale and severing the twine prior to ejecting the roll or bale from the machine. Generally, the twine wrapping apparatus employed by these machines included an elongated tube which oscillated in a predetermined path across the bale forming region to dispense the binding material as the material was wrapped about the bale. Automatic twine wrapping apparatus that serially undertook the previously mentioned three steps without any operator involvement, hydraulically or electrically powered apparatus requirng manual activation, and completely manually operated twine wrapping apparatus have been used in the art on the varying machines used to form cylindrical rolls of crop material. Operators and manufacturers of the more recent large roll forming machines quickly realized that the less time required for the twine wrapping cycle, the more time there would be for gathering crop material from the field to form completed crop rolls.

The current increasing popularity of large crop roll forming machines has seen their use broaden from merely rolling wintering forage for livestock to rolling high protein crops. Therefore, these machines have been the focal point of many ideas for developing twine wrapping apparatus that will appreciably decrease the amount of time required for the twine wrapping cycle, as well as active operator involvement in the cycle. Regardless of whether the twine wrapping apparatus is manual, powered or automatic, the time required to complete the cycle is directly a function of the amount of time it takes to dispense the binding material about the periphery of the completed crop roll and then cut the material. When only a single elongated tube is used to oscillate across the bale forming region to dispense binding material, the time required will necessarily be longer than if multiple elongated dispensing tubes are used to bind the full length of a completed crop roll. Accordingly, the use of multiple elongated dispensing tubes that oscillate simultaneously across distinct portions of the entire length of a completed crop roll substantially decrease the length of time required for the twine wrapping cycle to be completed. However, the use of multiple dispensing tubes requires the use of multiple binding material severing means.

The severing means must be synchronized in operation so that the strands of binding material dispensed from the elongated dispensing tubes are severed at approximately the same instant in time so that the twine wrapping cycle may be promptly terminated and the completed crop roll ejected from the crop roll forming machine. The multiple severing means also have to be reliable so that each and every strand of binding material is completely severed before the completed crop roll is ejected from the machine. Since cutting blades are commonly employed as the severing means, wear naturally occurs along the cutting edges. Extended use of the roll forming machine can result in sufficient wear occurring to one or more of the cutting blades so that one or more of the blades, usually operated by a unitary control system, will not cut one or more of the strands of binding material. Even after sharpening, the unitarily controlled and operated cutting blades require frequent adjustments to ensure they operate in a synchronized manner that will cut all the strands of twine at substantially the same time. Early efforts to utilize multiple cutting blades often resulted in only a portion of the multiple cutting blades effectively cutting the binding material. When this occurred, valuable time was wasted by the operator of a roll forming machine using automatic twine wrapping apparatus by having to manually sever the uncut pieces of binding material.

The foregoing problems are solved in the design of the apparatus comprising the present invention by providing multiple severing means in the form of cutting blades that are independently operable to concurrently sever binding material dispensed from a plurality of elongated dispensing tubes in a crop roll forming machine.

SUMMARY OF THE INVENTION

It is an object of the present invention to provide an improved twine wrapping apparatus that utilizes a plurality of independently operable and separately controlled cutting blades to concurrently sever multiple strands of bale binding material.

It is another object of the present invention to provide an improved twine wrapping apparatus that will decrease the amount of time required to complete the twine wrapping cycle.

It is another object of the instant invention to provide an improved twine wrapping apparatus that will permit the adjustment of each binding material cutting blade without affecting the performance of any other binding material cutting blades.

These and other objects and advantages are obtained by providing an improved twine wrapping apparatus in a crop roll forming machine utilizing a plurality of independently operable severing means in the form of cutting blades that, in synchronization, will be activated by triggering means to concurrently sever multiple strands of binding material.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
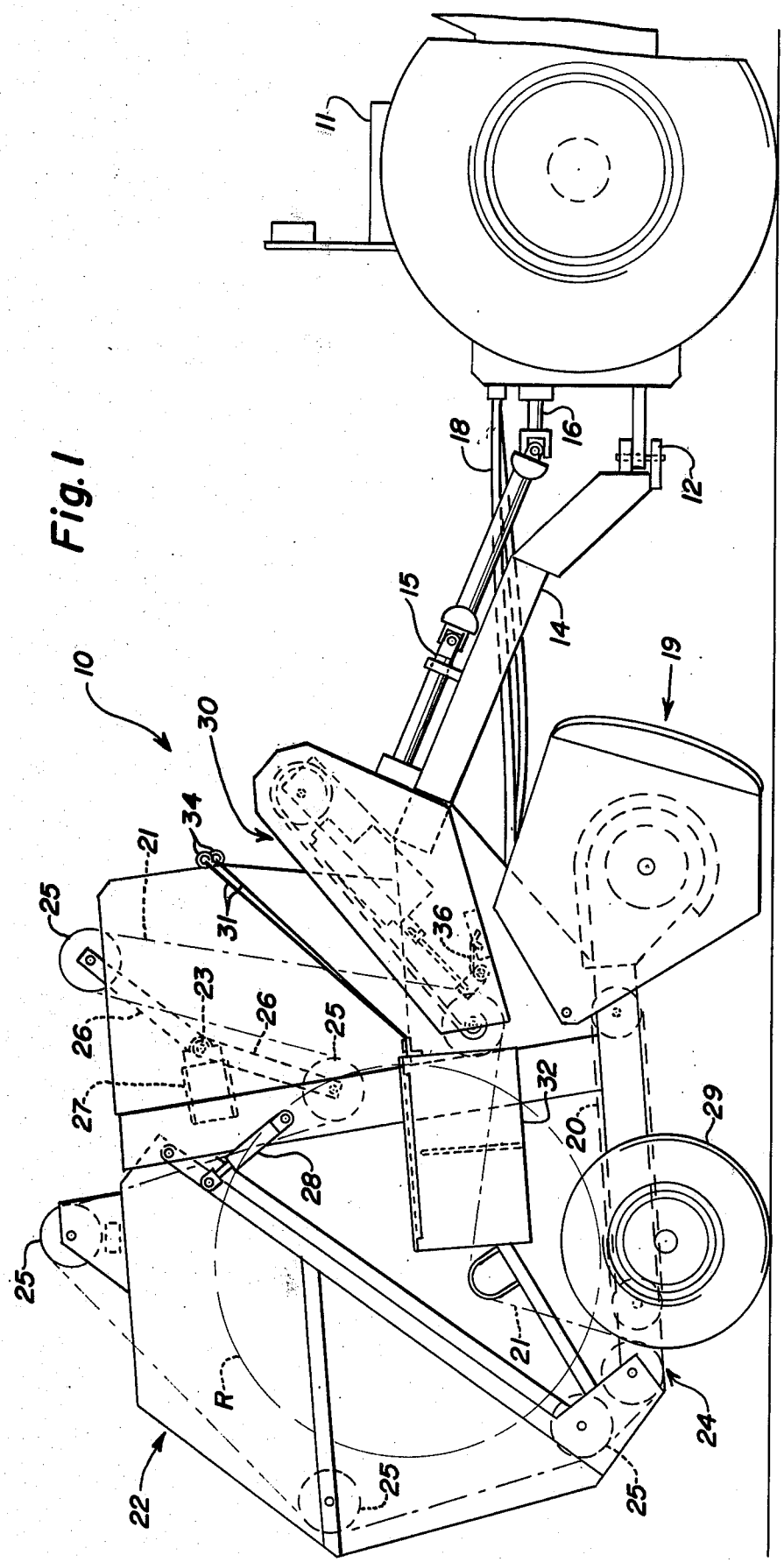
FIG. 1 is a side elevation of a crop roll forming machine illustrating the general location of the instant invention in its operational environment.

Referring generally to FIG. 1 there is shown a crop roll forming machine 10 connected to a towing vehicle, such as a tractor 11, by an appropriate hitch 12 and roll forming machine tongue 14. A power takeoff shaft 15 connects the tractor power takeoff 16 with the mechanically driven operational components of the crop roll forming machine 10. Hydraulic lines 18 connect the tractor hydraulic power source (not shown) with the hydraulically operable components of the roll forming machine 10. The roll forming machine 10 has a crop pickup, indicated generally by the numeral 19, which gathers the crop material from the field and delivers it to a lower apron, indicated generally by the numeral 20, which conveys the material rearwardly into contact with the upper bale forming means 21. Upper bale forming means 21 is mounted to an upper and lower frame, indicated generally by the numerals 22 and 24, respectively by means of a series of sprockets and guide rollers shown gerally by the numeral 25. Upper bale forming means 21 is extensible y means of a pair of takeup arms 26 mounted on both sides of the machine 10 by brackets 27 which permit the upper bale forming means 21 to be fed out around the ever expanding periphery of the crop roll R as it is formed within a bale forming region defined generally by the upper bale forming means 21 and the lower apron 20. Upper frame 22 is pivotably raisable at the completion of the twine wrapping cycle for ejection of the completed crop roll R by a pair of hydraulic cylinders 28, only one of which is shown. The crop roll forming machine 10 is mounted on a pair of wheels 29, only one of which is shown.

Twine wrapping apparatus, indicated generally by the numeral 30, is mounted to the side of lower frame 24 in a suitable manner. The binding material 31 is dispensed from binding material storage and dispensing containers 32 suitably affixed to the side of lower frame 24. The binding material 31 is guided by a suitable number of eyelets 34 to the twine dispensing tubes 35 of FIG. 4. The cutting blades 36 of twine wrapping apparatus 30 sever the binding material at the conclusion of the twine wrapping cycle and are best shown in FIGS. 4 and 6.

Figure 4:
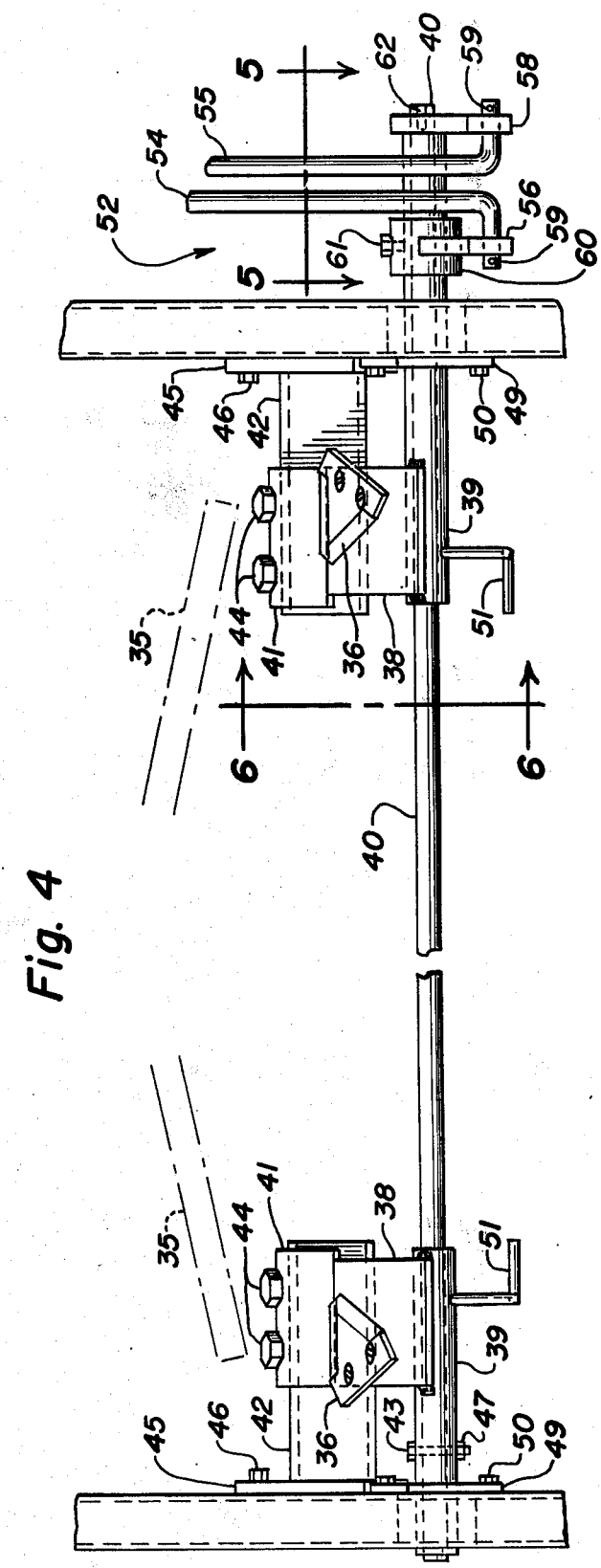
FIG. 4 is a front view of the independently operable multiple twine knives.
Figure 6:
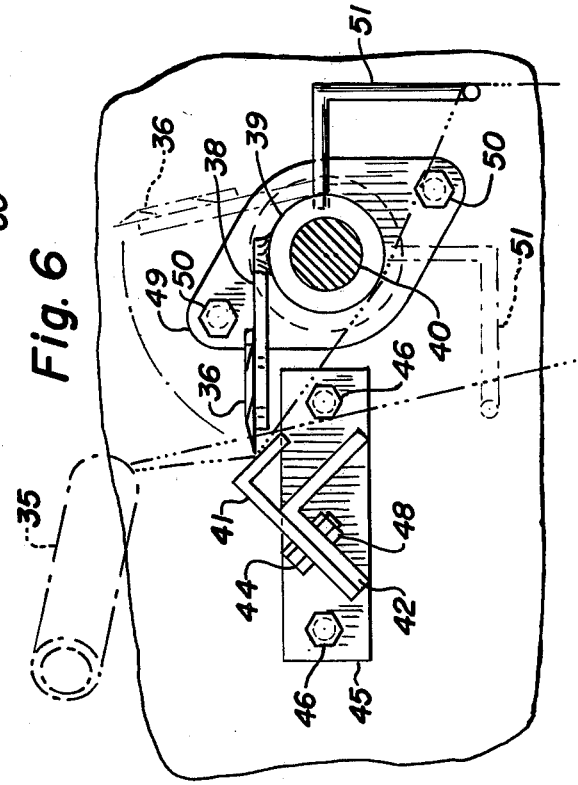
FIG. 6 is an enlarged scale side elevation taken along the line 6—6 of FIG. 4.

Cutting blades 36 are demountably fastened in a suitable manner, such as by rivets or bolts, to brackets 38 as shown in FIGS. 4 and 6. Brackets 38 are fixedly fastened in an appropriate manner, such as by welding, to sleeves 39, which are concentrically and rotatably mounted about an elongated rod 40. In their closed positions cutting blades 36 cuttingly interface with striker plates 41 which are fastened to brackets 42 in a suitable manner, such as by bolts 44. Brackets 42 are fastened to the side of lower frame 24 by side plates 45 which are appropriately fastened by welds, rivets or, as shown, bolts 46. As best seen in FIG. 6, striker plate 41 is an angled plate adjustably mounted by bolts 44 to the correspondingly angled bracket 42. Striker plate 41 is adjusted by loosening retaining nut 48 about bolt 44, thereby allowing the striker plate to be slid across the top of bracket 42 until the angled portion engages the edge of cutting blade 36.

Rotatable rod 40, with concentrically mounted sleeves 39 at each side of the roll forming machine 10, is mounted to the side frame by brackets 49 secured by mounting bolts 50. Beneath each of the cutting blades 36 and fastened to the rotatable sleeve 39 there is an angled guide 51 which serves to position the binding material 31 at the extremities of the crop roll R and to prevent it from running past the extreme edges of the roll R so that the binding material 31 is wrapped about the periphery of crop roll R during the wrapping cycle. The rotational movement of elongate rod 40 is translated to the sleeve 39 furthest from the triggering means 52 by locking bolt 43 and locking nut 47.

Figure 2:
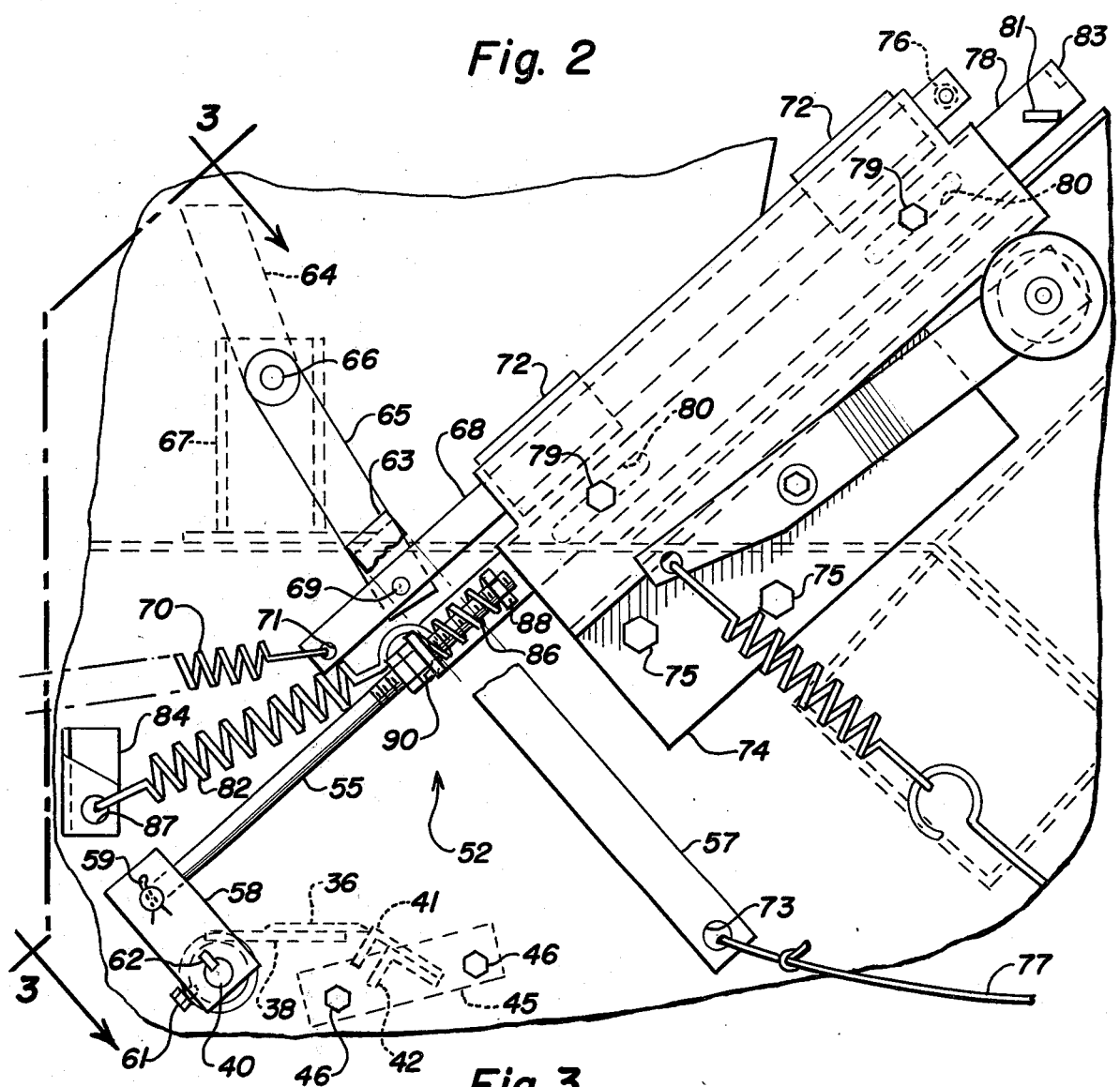
FIG. 2 is a side view of the front portion of a roll forming machine showing a twine wrapping apparatus trip mechanism connected to the independently operable twine knives.
Figure 5:
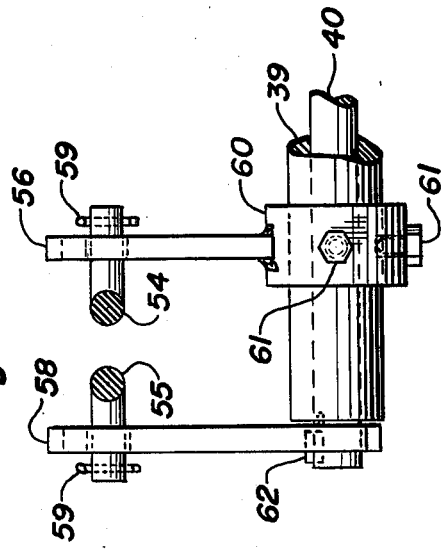
FIG. 5 is an enlarged scale fragmentary top plan view taken along the lines 5—5 of FIG. 4.

The cutting blades 36 are activated by a triggering means indicated generally by the numeral 52 in FIG. 2. Elongate rod 40, particularly that portion located on the side of the roll forming machine 10 on which the triggering means 52 is found, is connected to the pair of control rods 54 and 55 respectively, best shown in FIGS. 4 and 5. Rods 54 and 55 are attached to a pair of rotatable latch plates 56 and 58 respectively, and are retained by cotter pins 59. Latch arm 56 of control rod 54 is fixedly fastened in a manner such as welding to collar 60 mounted about sleeve 39. Collar 60 is rotatably fastened to sleeve 39 by suitable means, such as set screws 61. Latch plate 58 of control rod 55 is suitably affixed to shaft 40, typically being keyed at 62. The cutting blades 36 then, are actuated by means of the displacement of the control rods 56 and 58 in a suitable direction to rotatably open or rotatably close the cutting blades 36 against striker plates 41.

Figure 7:
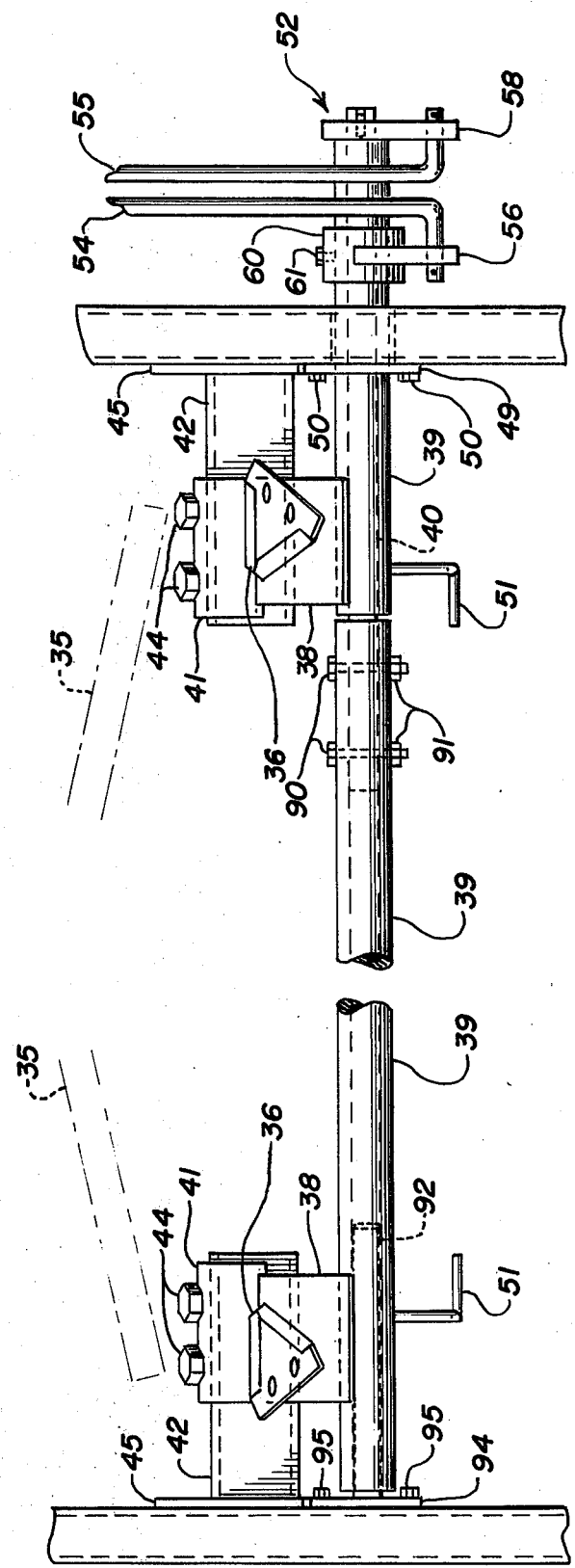
FIG. 7 is a front view of an alternative embodiment of the independently operable multiple twine knives.

An alternative embodiment of the apparatus comprisng the independently operable severing means is shown in FIG. 7. In this arrangement of components the cutting blades 36 are demountably fastened to the rotatable brackets 38 as previously described. The rotatable brackets 38 are fastened to sleeves 39 also in the previously described manner. In this configuration only the sleeve 39 nearest the triggering means 52 is rotatably and concentrically mounted about elongate rod 40. Elongate rod 40 does not span the entire width of the roll forming machine 10, but is mounted to the triggering means side of the lower frame 24 by bracket 49. Bracket 49 is secured by mounting bolts 50. The rotational movement of elongated rod 40 is translated to the sleeve 39 furthest from the triggering means 52 by locking bolts 90 and locking nuts 91. Locking bolts 90 are fitted through appropriately sized apertures (not shown) in elongate rod 40 and the sleeve 39 furthest from the triggering means 52. The sleeve 39 furthest from the trigger means 52 is slit on opposing surfaces (not shown) to permit the sleeve 39 to tightly clamped to rod 40 by the bolts 90 and locking nuts 91. On the side of the roll forming machine 10 opposite the triggering means 52 the sleeve 39 is rotatably and concentrically mounted about a stub shaft 92 which is mounted to the side frame by bracket 94 and mounting bolts 95. Stub shaft 92 could alternatively be rotatably mounted to the side of lower frame 24 and bolted to the sleeve 39 furthest from the triggering means 52 in a manner similar to that done by bolts 90 and locking nuts 91. The cutting blades 36 and all other operable components of this embodiment function in the same manner as that described in relation to FIG. 4. A possible advantage of this structure over that shown in FIG. 4 lies in the added strength of the structure supporting the cutting blades 36 and spanning the width of the roll forming machine 10 so that the extended use of the dispensing tubes 35 will not cause the rod 40 and sleeves 39 to bend should the dispensing tubes 35 strike them.

Figure 3:
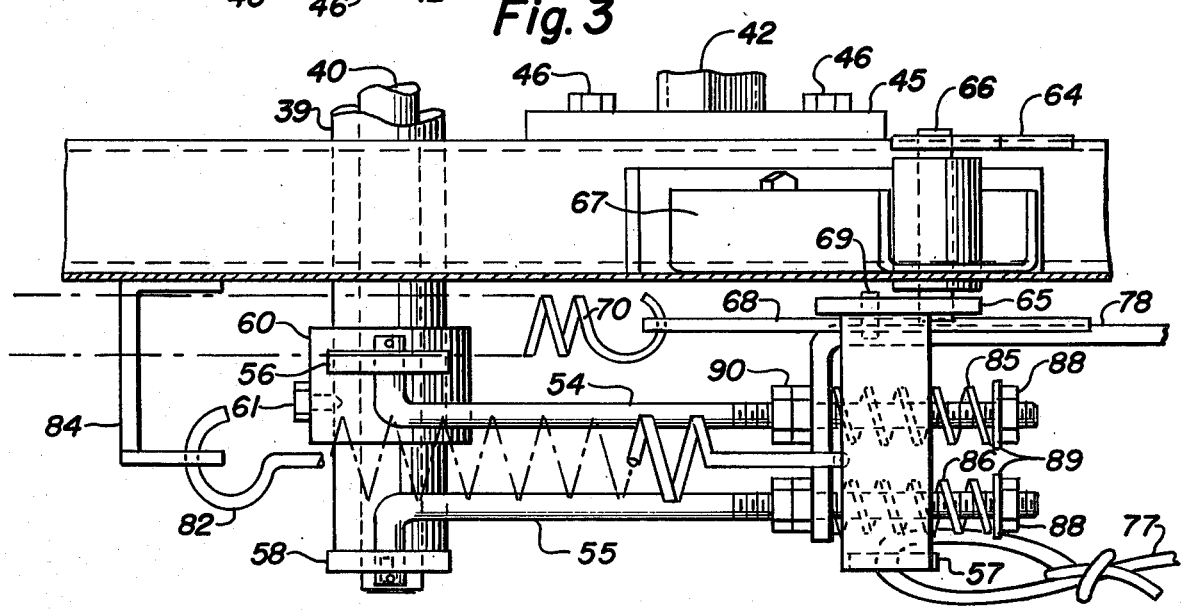
FIG. 3 is a top plan view of FIG. 2 taken along the line 3—3.

The triggering means 52 is best seen in its entirety in FIGS. 2 and 3. Triggering means 52 comprises a pair of latch arms 64 and 65 respectively, which are mounted about journal 66 to side frame bracket 67. The side frame bracket 67 is in turn mounted to a side of lower frame 24 in a suitable fashion such as welding or bolting. The latch arms 64 and 65 are mounted about journal 66 in such a manner that the rotation of either arm causes the other to move in a correspondingly opposite direction.

The latch arms 64 and 65 are selectively actuatable by either one of two trip machanisms (not shown), details of the structure and operation of which are fully presented in the concurrently filed copending application, Ser. No. 894,457, entitled "Improved Automatic Twine Wrapping Apparatus" of Freimuth et al, assigned to the assignee of the present invention and herein specifically incorporated by reference. An automatic trip mechanism (not shown) has an appropriate projection (not shown) which engages latch arm 64 as the upper bale forming means 21 is fed out by the rotation of the takeup arms 26 in a clockwise direction about takeup arm shaft 23, briefly see FIG. 1. The engagement of latch arm 64 by the projection moves the latch arm 64 rearwardly and causes the opposing latch arm 65 to be rotated forwardly. Latch arm 65 is rotatably fastened to roller arm 68 by stub shaft and bushing 69 in a suitable fashion. Roller arm 68 is biased by spring 70, fastened to the arm through an aperture 71 and anchored to the side of lower frame 24 in an appropriate fashion, such as a bracket (not shown). Roller arm 68 is guided by a pair of brackets 72 suitably fastened to side plate 74, which is in turn bolted to the side of lower frame 24 by bolts 75. Roller arm 68 has a rotatable roller 76 affixed at its forwardmost end. The forward movement of latch arm 65 correspondingly moves roller arm 68 forwardly causing the roller 76 to engage a suitable control means (not shown) of twine wrapping apparatus 30 that causes the twine dispensing tubes 35 to be driven in a predetermined path across the length of the completed crop roll R. This causes the binding material 31 to be wrapped about the periphery of the completed crop roll R.

The second of the two trip mechanisms for the triggering means 52 comprises a manually activated lever 57 welded to latch arm 65 at 63 in FIG. 2. The lower portion of manual trip lever 57 may be equipped with an aperture 73, suitable for fastening a rope 77 or some other suitable tensioning means thereto. Rope 77 is then guided through an eyelet (not shown) to the operator's position on the towing tractor 11.

A stop arm 78 is movably suspended from side plate 74 by bolts 79 extended through the slots 80 of plate 74. Stop arm 78 has an angled stop plate 81 which engages a pawl (not shown) of the clutch timing device of the control means to permit rotary power to be transferred in a suitable fashion to the twine wrapping apparatus 30. Further details of the structure and operation of the clutch mechanism and the twine wrapping apparatus are given in the previously referenced concurrently filed copending application Ser. No. 894,457, of Freimuth et al.

Stop arm 78 of FIG. 2 is biased generally rearwardly and downwardly by stop arm spring 82 fastened to the aperture 87 of bracket 84 that is bolted or welded to the side of lower frame 24. Stop arm 78 is L-shaped at its lowermost portion and has appropriate apertures through which the control rods 54 and 55 pass. As best seen in FIG. 3, control rods 54 and 55 are spring biased by springs 85 and 86, respectively. Springs 85 and 86 are concentrically mounted about control rods 54 and 55. Springs 85 and 86 are retained on their respective rods at their forwardmost portions by locking nuts 88 and washers 89. Spring pressure on each of the control rods 54 and 55 is adjustable by means of adjusting nuts 90. At its forwardmost portion stop arm 78 has an L-shaped extension 83 that is engaged by an appropriate portion of the control means (not shown) of twine wrapping apparatus 50.

In operation the triggering means 52 is actuated by the forwardly and upwardly movement of latch arm 65, which correspondingly displaces roller arm 68, causing roller 76 to engage the control means. This engagement of the control means permits the stop arm 78 to be released and respond to its spring biasing by moving generally downwardly and rearwardly, thereby permitting a clutch to transmit rotary power to the twine wrapping apparatus 30. The downwardly and rearwardly movement of stop arm 78 causes the control rods 54 and 55 to rotate their latch plates 56 and 58 in a counterclockwise direction. This counterclockwise rotation is translated to sleeves 39 by means of rod 40 and collar 60. This counterclockwise rotation opens the cutting blades 36 from their cutting engagement with striker plates 41. This permits the binding material 31 to be dispensed across the periphery of the completed crop roll R by the twine dispensing tubes 35 in response to the driving force of the twine wrapping apparatus 30 in a manner that is described and illustrated in detail in the concurrently filed copending application, Ser. No. 894,458, entitled "Center Pivot Dispensing Apparatus" of Campbell et al, assigned to the assignee of the present invention and herein specifically incorporated by reference.

At the conclusion of the twine wrapping cycle the twine dispensing tubes 35 return to a home position and the control means causes the stop arm 78 to be lifted forwardly and upwardly by means of the engagement of the stop arm L-shaped extension 83. This forwardly and upwardly displacement of stop arm 78 causes the control rods 54 and 55 to be correspondingly displaced. This displacement, in turn, causes the latch plates 56 and 58 to rotate in a clockwise direction, thereby causing a similar rotation of elongate rod 40 and collar 60. Collar 60, being rotatably fastened to the sleeve 39 nearest the triggering means 52 by set screws 61, then causes the sleeve 39 with its associated rotatable bracket 38 and cutting blade 36 to be rotated in clockwise manner until cutting blade 36 cuttingly engages striker plate 41. At the same time the clockwise rotation of elongate rod 40 causes the sleeve 39 furthest from the triggering means 52 to be correspondingly rotated in a clockwise direction by means of locking bolt 43 and locking nut 47. This clockwise rotation of the sleeve 39 furthest from the triggering means, in a manner similar to that just described, causes mounting bracket 38 and cutting blade 36 to also be rotated clockwise until cutting blade 36 cuttingly engages striker plate 41. The cutting engagement by cutting blades 36 of striker plates 41, is thus accomplished at substantially the same instant in time by the independent operation of the cutting blades 36.

It should be noted that while only two independently operably cutting blades are shown, a greater number can easily be incorporated into the apparatus of a roll forming machine's twine wrapping apparatus. It should also be noted that the rotatable cutting blades 36 and rotatable mounting brackets 38 could quite easily be made the stationary components fixed to the frame of the roll forming machine and the striker plates 41 could alternatively be rotatably mounted to the sleeves 39 without impairing the efficiency of the twine severing means.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and the arrangements of parts which will occur to one of skill in the art upon a reading of this disclosure.

Having thus described the invention, what is claimed is:

1. In a crop roll forming machine of the type having a bale forming region defined by bale forming means mounted on a mobile frame, wrapping means including a plurality of binding material dispensing means adjacent the bale forming region to dispense a binding material about a completed crop roll and drive means operatively connected to the bale forming means and the wrapping means, the improvement in the wrapping means comprising:

an elongate rod supported on the frame across and adjacent the bale forming region, the rod having concentrically mounted thereabout a plurality of rotatable sleeve means corresponding in number to the plurality of dispensing means;

a plurality of triggering means each one of which is associated, respectively with a corresponding one of the sleeve means to rotate the sleeve means about the longitudinal axis of the rod; and a plurality of severing means each cooperatively associated with a respective one of the sleeve means, whereby activation of the triggering means causes rotation of the sleeve means and a resultant actuation of the severing means to sever the binding material from each dispensing means.

2. The apparatus according to claim 1, wherein each severing means further comprises a first and a second portion, the first portion including a cutting blade rotatably affixed to the sleeve means and the second portion including a striker plate affixed to the frame so that upon activation of each one of the triggering means the corresponding sleeve means mounted about the elongate rod is rotated in substantial synchronization to thereby cause each of the cutting blades to engage the corresponding striker plate and concurrently effect the severing of binding material positioned therebetween by the dispensing means.

3. The apparatus according to claim 2, wherein the triggering means collectively further comprise a plurality of pivotable latch arms fastened to a plurality of biased control arms connected to a corresponding number of the sleeve means such that upon the movement of the latch arm in a suitable direction the control rods correspondingly are displaced from a first position in which the cutting blades are not in contact with the striker plates to a second position such that the sleeve means and the cutting blades are arcuately displaced so that the cutting blades rotatably engage the striker plates thereby severing the binding material therebetween.

4. The apparatus according to claim 2 or 3, wherein the elongate rod is rotatable relative to the frame so that upon the collective activation of the triggering means the elongate rod and the corresponding sleeve means mounted thereabout are rotated to cause the cutting blades to cuttingly engage the binding material against the corresponding striker plates thereby severing the binding material placed therebetween by the dipensing means.

The cutting blades 36 are activated by a triggering means indicated generally by the numeral 52 in FIG. 2. Elongate rod 40, particularly that portion located on the side of the roll forming machine 10 on which the triggering means 52 is found, is connected to the pair of control rods 54 and 55 respectively, best shown in FIGS. 4 and 5. Rods 54 and 55 are attached to a pair of rotatable latch plates 56 and 58 respectively, and are retained by cotter pins 59. Latch arm 56 of control rod 54 is fixedly fastened in a manner such as welding to collar 60 mounted about sleeve 39. Collar 60 is rotatably fastened to sleeve 39 by suitable means, such as set screws 61. Latch plate 58 of control rod 55 is suitably affixed to shaft 40, typically being keyed at 62. The cutting blades 36 then, are actuated by means of the displacement of the control rods 56 and 58 in a suitable direction to rotatably open or rotatably close the cutting blades 36 against striker plates 41.

An alternative embodiment of the apparatus comprisng the independently operable severing means is shown in FIG. 7. In this arrangement of components the cutting blades 36 are demountably fastened to the rotatable brackets 38 as previously described. The rotatable brackets 38 are fastened to sleeves 39 also in the previously described manner. In this configuration only the sleeve 39 nearest the triggering means 52 is rotatably and concentrically mounted about elongate rod 40. Elongate rod 40 does not span the entire width of the roll forming machine 10, but is mounted to the triggering means side of the lower frame 24 by bracket 49. Bracket 49 is secured by mounting bolts 50. The rotational movement of elongated rod 40 is translated to the sleeve 39 furthest from the triggering means 52 by locking bolts 90 and locking nuts 91. Locking bolts 90 are fitted through appropriately sized apertures (not shown) in elongate rod 40 and the sleeve 39 furthest from the triggering means 52. The sleeve 39 furthest from the trigger means 52 is slit on opposing surfaces (not shown) to permit the sleeve 39 to tightly clamped to rod 40 by the bolts 90 and locking nuts 91. On the side of the roll forming machine 10 opposite the triggering means 52 the sleeve 39 is rotatably and concentrically mounted about a stub shaft 92 which is mounted to the side frame by bracket 94 and mounting bolts 95. Stub shaft 92 could alternatively be rotatably mounted to the side of lower frame 24 and bolted to the sleeve 39 furthest from the triggering means 52 in a manner similar to that done by bolts 90 and locking nuts 91. The cutting blades 36 and all other operable components of this embodiment function in the same manner as that described in relation to FIG. 4. A possible advantage of this structure over that shown in FIG. 4 lies in the added strength of the structure supporting the cutting blades 36 and spanning the width of the roll forming machine 10 so that the extended use of the dispensing tubes 35 will not cause the rod 40 and sleeves 39 to bend should the dispensing tubes 35 strike them.

The triggering means 52 is best seen in its entirety in FIGS. 2 and 3. Triggering means 52 comprises a pair of latch arms 64 and 65 respectively, which are mounted about journal 66 to side frame bracket 67. The side frame bracket 67 is in turn mounted to a side of lower frame 24 in a suitable fashion such as welding or bolting. The latch arms 64 and 65 are mounted about journal 66 in such a manner that the rotation of either arm causes the other to move in a correspondingly opposite direction.

The latch arms 64 and 65 are selectively actuatable by either one of two trip machanisms (not shown), details of the structure and operation of which are fully presented in the concurrently filed copending application, Ser. No. 894,457, entitled "Improved Automatic Twine Wrapping Apparatus" of Freimuth et al, assigned to the assignee of the present invention and herein specifically incorporated by reference. An automatic trip mechanism (not shown) has an appropriate projection (not shown) which engages latch arm 64 as the upper bale forming means 21 is fed out by the rotation of the takeup arms 26 in a clockwise direction about takeup arm shaft 23, briefly see FIG. 1. The engagement of latch arm 64 by the projection moves the latch arm 64 rearwardly and causes the opposing latch arm 65 to be rotated forwardly. Latch arm 65 is rotatably fastened to roller arm 68 by stub shaft and bushing 69 in a suitable fashion. Roller arm 68 is biased by spring 70, fastened to the arm through an aperture 71 and anchored to the side of lower frame 24 in an appropriate fashion, such as a bracket (not shown). Roller arm 68 is guided by a pair of brackets 72 suitably fastened to side plate 74, which is in turn bolted to the side of lower frame 24 by bolts 75. Roller arm 68 has a rotatable roller 76 affixed at its forwardmost end. The forward movement of latch arm 65 correspondingly moves roller arm 68 forwardly causing the roller 76 to engage a suitable control means (not shown) of twine wrapping apparatus 30 that causes the twine dispensing tubes 35 to be driven in a predetermined path across the length of the completed crop roll R. This causes the binding material 31 to be wrapped about the periphery of the completed crop roll R.

The second of the two trip mechanisms for the triggering means 52 comprises a manually activated lever 57 welded to latch arm 65 at 63 in FIG. 2. The lower portion of manual trip lever 57 may be equipped with an aperture 73, suitable for fastening a rope 77 or some other suitable tensioning means thereto. Rope 77 is then guided through an eyelet (not shown) to the operator's position on the towing tractor 11.

A stop arm 78 is movably suspended from side plate 74 by bolts 79 extended through the slots 80 of plate 74. Stop arm 78 has an angled stop plate 81 which engages a pawl (not shown) of the clutch timing device of the control means to permit rotary power to be transferred in a suitable fashion to the twine wrapping apparatus 30. Further details of the structure and operation of the clutch mechanism and the twine wrapping apparatus are given in the previously referenced concurrently filed copending application Ser. No. 894,457, of Freimuth et al.

Stop arm 78 of FIG. 2 is biased generally rearwardly and downwardly by stop arm spring 82 fastened to the aperture 87 of bracket 84 that is bolted or welded to the side of lower frame 24. Stop arm 78 is L-shaped at its lowermost portion and has appropriate apertures through which the control rods 54 and 55 pass. As best seen in FIG. 3, control rods 54 and 55 are spring biased by springs 85 and 86, respectively. Springs 85 and 86 are concentrically mounted about control rods 54 and 55. Springs 85 and 86 are retained on their respective rods at their forwardmost portions by locking nuts 88 and washers 89. Spring pressure on each of the control rods 54 and 55 is adjustable by means of adjusting nuts 90. At its forwardmost portion stop arm 78 has an L-shaped extension 83 that is engaged by an appropriate portion of the control means (not shown) of twine wrapping apparatus 50.

In operation the triggering means 52 is actuated by the forwardly and upwardly movement of latch arm 65, which correspondingly displaces roller arm 68, causing roller 76 to engage the control means. This engagement of the control means permits the stop arm 78 to be released and respond to its spring biasing by moving generally downwardly and rearwardly, thereby permitting a clutch to transmit rotary power to the twine wrapping apparatus 30. The downwardly and rearwardly movement of stop arm 78 causes the control rods 54 and 55 to rotate their latch plates 56 and 58 in a counterclockwise direction. This counterclockwise rotation is translated to sleeves 39 by means of rod 40 and collar 60. This counterclockwise rotation opens the cutting blades 36 from their cutting engagement with striker plates 41. This permits the binding material 31 to be dispensed across the periphery of the completed crop roll R by the twine dispensing tubes 35 in response to the driving force of the twine wrapping apparatus 30 in a manner that is described and illustrated in detail in the concurrently filed copending application, Ser. No. 894,458, entitled "Center Pivot Dispensing Apparatus" of Campbell et al, assigned to the assignee of the present invention and herein specifically incorporated by reference.

At the conclusion of the twine wrapping cycle the twine dispensing tubes 35 return to a home position and the control means causes the stop arm 78 to be lifted forwardly and upwardly by means of the engagement of the stop arm L-shaped extension 83. This forwardly and upwardly displacement of stop arm 78 causes the control rods 54 and 55 to be correspondingly displaced. This displacement, in turn, causes the latch plates 56 and 58 to rotate in a clockwise direction, thereby causing a similar rotation of elongate rod 40 and collar 60. Collar 60, being rotatably fastened to the sleeve 39 nearest the triggering means 52 by set screws 61, then causes the sleeve 39 with its associated rotatable bracket 38 and cutting blade 36 to be rotated in clockwise manner until cutting blade 36 cuttingly engages striker plate 41. At the same time the clockwise rotation of elongate rod 40 causes the sleeve 39 furthest from the triggering means 52 to be correspondingly rotated in a clockwise direction by means of locking bolt 43 and locking nut 47. This clockwise rotation of the sleeve 39 furthest from the triggering means, in a manner similar to that just described, causes mounting bracket 38 and cutting blade 36 to also be rotated clockwise until cutting blade 36 cuttingly engages striker plate 41. The cutting engagement by cutting blades 36 of striker plates 41, is thus accomplished at substantially the same instant in time by the independent operation of the cutting blades 36.

It should be noted that while only two independently operably cutting blades are shown, a greater number can easily be incorporated into the apparatus of a roll forming machine's twine wrapping apparatus. It should also be noted that the rotatable cutting blades 36 and rotatable mounting brackets 38 could quite easily be made the stationary components fixed to the frame of the roll forming machine and the striker plates 41 could alternatively be rotatably mounted to the sleeves 39 without impairing the efficiency of the twine severing means.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and the arrangements of parts which will occur to one of skill in the art upon a reading of this disclosure.

Having thus described the invention, what is claimed is:

1. In a crop roll forming machine of the type having a bale forming region defined by bale forming means mounted on a mobile frame, wrapping means including a plurality of binding material dispensing means adjacent the bale forming region to dispense a binding material about a completed crop roll and drive means operatively connected to the bale forming means and the wrapping means, the improvement in the wrapping means comprising:

an elongate rod supported on the frame across and adjacent the bale forming region, the rod having concentrically mounted thereabout a plurality of rotatable sleeve means corresponding in number to the plurality of dispensing means;

a plurality of triggering means each one of which is associated, respectively with a corresponding one of the sleeve means to rotate the sleeve means about the longitudinal axis of the rod; and a plurality of severing means each cooperatively associated with a respective one of the sleeve means, whereby activation of the triggering means causes rotation of the sleeve means and a resultant actuation of the severing means to sever the binding material from each dispensing means.

2. The apparatus according to claim 1, wherein each severing means further comprises a first and a second portion, the first portion including a cutting blade rotatably affixed to the sleeve means and the second portion including a striker plate affixed to the frame so that upon activation of each one of the triggering means the corresponding sleeve means mounted about the elongate rod is rotated in substantial synchronization to thereby cause each of the cutting blades to engage the corresponding striker plate and concurrently effect the severing of binding material positioned therebetween by the dispensing means.

3. The apparatus according to claim 2, wherein the triggering means collectively further comprise a plurality of pivotable latch arms fastened to a plurality of biased control arms connected to a corresponding number of the sleeve means such that upon the movement of the latch arm in a suitable direction the control rods correspondingly are displaced from a first position in which the cutting blades are not in contact with the striker plates to a second position such that the sleeve means and the cutting blades are arcuately displaced so that the cutting blades rotatably engage the striker plates thereby severing the binding material therebetween.

4. The apparatus according to claim 2 or 3, wherein the elongate rod is rotatable relative to the frame so that upon the collective activation of the triggering means the elongate rod and the corresponding sleeve means mounted thereabout are rotated to cause the cutting blades to cuttingly engage the binding material against the corresponding striker plates thereby severing the binding material placed therebetween by the dipensing means.

5. In a crop roll forming machine of the type having a bale forming means mounted on a mobile frame, wrapping means including a plurality of binding material dispensing means adjacent the bale forming region to dispense a binding material about a completed crop roll and drive means operatively connected to the bale forming means and the wrapping means, the improvement comprising:
- a plurality of cooperatively connected rotatable elongate sleeve means across and adjacent the bale forming region, at least a portion of the sleeve means being concentrically mounted about a first and a second elongate rod each having a longitudinal axis and being fastened to an opposing side of the frame;
- a plurality of triggering means each one cooperatively associated with a corresponding one of the sleeve means to rotate the plurality of sleeve means about the longitudinal axes of the first and second elongate rods; and
- a plurality of severing means each cooperatively associated with one of the sleeve means, whereby activation of the triggering means causes rotation of the plurality of sleeve means and a resultant actuation of the severing means to sever the binding material from each dispensing means.

6. The apparatus according to claim 5, wherein each severing means further comprises a first and a second portion, the first portion including a cutting blade rotatably affixed to one of the sleeve means and the second portion including a striker plate affixed to the frame so that upon activation of each one of the triggering means the corresponding sleeve means is rotated in substantial synchronization to thereby cause each of the cutting blades to engage the corresponding striker plate and concurrently effect the severing of binding material positioned therebetween by the dispensing means.

7. The apparatus according to claim 6, wherein the triggering means collectively further comprise a plurality of pivotable latch arms fastened to a plurality of biased control arms connected to a corresponding number of the sleeve means such that upon the movement of the latch arms in a suitable direction the control rods correspondingly are displaced from a first position in which the cutting blades are not in contact with the striker plates to a second position such that the sleeve means and the cutting blades are arcuately displaced so that the cutting blades rotatably engage the striker plates thereby severing the binding material therebetween.

8. The apparatus according to claims 6 or 7, wherein the first elongate rod is rotatable relative to the frame so that upon the collective activation of the triggering means the first elongate rod and the corresponding sleeve means mounted about the first and the second elongate rods are rotated to cause the cutting blades to cuttingly engage the binding material against the corresponding striker plates thereby severing the binding material placed therebetween by the dispensing means.

* * * * *